United States Patent
Elbaz

(10) Patent No.: US 9,276,389 B1
(45) Date of Patent: Mar. 1, 2016

(54) COVER FOR OUTDOOR ELECTRICAL DEVICES

(71) Applicant: Michael Elbaz, New York, NY (US)

(72) Inventor: Michael Elbaz, New York, NY (US)

(73) Assignee: Superflex, Ltd., Brooklyn, NY (US)

( * ) Notice: Subject to any disclaimer, the term of this patent is extended or adjusted under 35 U.S.C. 154(b) by 0 days.

(21) Appl. No.: 14/558,454

(22) Filed: Dec. 2, 2014

(51) Int. Cl.
*H02G 3/14* (2006.01)
*H02G 3/12* (2006.01)
*H02G 3/08* (2006.01)

(52) U.S. Cl.
CPC ............. *H02G 3/14* (2013.01); *H02G 3/088* (2013.01); *H02G 3/121* (2013.01)

(58) Field of Classification Search
USPC .......................................................... 174/66
See application file for complete search history.

(56) References Cited

U.S. PATENT DOCUMENTS

| | | |
|---|---|---|
| 5,280,135 A | 1/1994 | Berlin |
| 6,642,453 B2 | 11/2003 | Shotey |
| 7,622,676 B2 | 11/2009 | Drane |
| 7,683,257 B1 | 3/2010 | Shotey |
| 7,728,226 B2 | 6/2010 | Drane |
| 7,915,528 B2 | 3/2011 | Ni |
| 8,104,639 B1 * | 1/2012 | Cleghorn ............... H01H 9/02 174/50 |
| 8,314,334 B1 | 11/2012 | Cleghorn |
| 8,586,864 B1 * | 11/2013 | Shotey ................. H02G 3/14 174/53 |
| 9,022,336 B2 * | 5/2015 | Huynh ................ A47G 29/10 174/66 |

* cited by examiner

*Primary Examiner* — Dhirubhai R Patel
(74) *Attorney, Agent, or Firm* — Seth Natter; Natter & Natter

(57) ABSTRACT

An electrical device cover includes an access panel having an orifice and an adapter plate configured with an opening dimensioned to receive the operative face of an electrical device. The front face of the access panel includes a depressed platform surrounding the orifice and dimensioned to receive the adapter plate. An interlock between the access panel and the adapter plate is provided by channels formed on the rear face of the adapter plate and the front of the access panel and fillets formed on the access panel, and adapter plate, the fillets being seated in the channels. The adapter plate includes a pair of trapezium flanges which define the longitudinal boundaries of the adapter plate and which are received in the depressed platform.

20 Claims, 10 Drawing Sheets

COVER FOR OUTDOOR ELECTRICAL DEVICES

BACKGROUND OF THE INVENTION

1. Field of the Invention

This invention relates generally to outdoor electrical device covers and more particularly to a cover having components which are adaptable for covering a variety of different electrical devices while providing an interlocking seal between the cover components.

2. Antecedents of the Invention

There exists a wide variety of electrical devices mounted within boxes of electrical systems, e.g., receptacles of different voltage and current capacities, toggle switches, paddle switches, GFCI (ground fault circuit interrupter) units, etc., having different sizes and shapes which necessitate device covers dimensioned to accommodate the face of each specific device. Covers for devices exposed to weather also required a weather proof lid and, in some instances, a locking mechanism. Because each different size and shape of device required a different type of cover configured for it, an electrician was required to carry several types of covers to the job site.

Attempts have been made at providing an adaptable cover which could be configured to fit commonly encountered devices. Face plate or cover assemblies that were convertible to accommodate multiple styles of electrical devices have been employed. These cover assemblies generally include a number of adapter plates to accommodate different types of electrical devices. An appropriate adapter plate was selected, depending on the type of electrical device, and the selected plate was positioned at the either the front or rear of an access panel of the cover. The cover was then mounted to the electrical box carrying the electrical device.

Adapter plates with breakaway tabs for converting the adapter plate to the electrical device being installed have also been proposed, as disclosed in U.S. Pat. No. 6,642,453.

Mechanical interlocking arrangements between the adapter plates and the access panel of the cover included tabs or ears which projected from the adapter plates have been disclosed in U.S. Pat. No. 7,683,257. Often no mechanical interlock was provided and the adapter plates were retained by the device mounting screws or a screw which was received in the device itself, e.g., a center aperture in a duplex receptacle. In some instances, adapter plates were merely sandwiched between the rear face of the access panel and the device.

Such prior arrangements presented problems with respect to labor costs due to time required for obtaining proper registration of the adapter plate, the access panel, the electrical device and the electrical box carrying the electrical device. Often, several adjustments were required for proper alignment of the adapter plate, cover, electrical device and electrical box.

In outdoor environments it was necessary to employ an electrical box which was water resistant, so as to protect the components housed therein. Undesirable accumulation of water within the box was detrimental to the electrical devices housed therein and often resulted in short circuits or other potentially dangerous conditions. Various electrical codes and standards such as those promulgated by Underwriters Laboratories (UL) required exterior outlet boxes to have a certain degree of water resistance, i.e., resistance to entry of water over a period of time.

A wide variety of device covers have been designed with the object of preventing the accumulation of water within the box. These covers typically included a hinged lid, which provided access to the device when open and reduced the ability of moisture to enter the box when closed. Significantly, however, these prior covers did not assure an effective resistance to water penetration between the adapter plate and the access panel of the cover, such that water, as well as other moisture related contaminants could enter the box between the adapter plate and the access panel and degrade any wiring connections within the box as well as the device itself.

SUMMARY OF THE INVENTION

An electrical device cover includes a housing having a hinged lid and an access panel. A rectangular orifice of the access panel is dimensioned to accommodate adapter plates. Each adapter plate includes an opening configured to receive the operative face of a specific electrical device. The adapter plates include a generally planar body having trapezium flanges which define its longitudinal boundaries. A selected adapter plate is received within a platform depressed in the front face of the access panel to facilitate alignment and registration of the adapter plate and access panel.

A water resistant interlock between the adapter plate and the access panel is effected by a fillet and channel formed on the rear face of the adapter plate and a mating fillet and channel on the front face of the access panel. The fillet of the adapter plate seats in the channel of the access panel and the fillet of the access panel seats in the channel of the adapter plate.

From the foregoing compendium, it will be appreciated that an aspect of the present invention is to provide a cover for outdoor electrical devices of the general character described which is not subject to the foregoing disadvantages of the antecedents of the invention.

A feature of the present invention is to provide a cover for outdoor electrical devices of the general character described which is simple to assemble and easy to use.

A consideration of the present invention is to provide a cover for outdoor electrical devices of the general character described which is well suited for heavy duty applications.

A further aspect of the present invention is to provide a cover for outdoor electrical devices of the general character described which may be manufactured by economical mass production fabrication.

A still further consideration of the present invention is to provide a cover for outdoor electrical devices of the general character described which is capable of withstanding stress encountered during assembly and mounting to an electrical box as well as residual stress.

Another feature of the present invention is to provide a cover for outdoor electrical devices of the general character described with simplified installation procedures.

An additional consideration of the present invention is to provide a cover for outdoor electrical devices of the general character described having a water resistant interlock between an adapter plate and an access panel of the cover.

To provide a cover for outdoor electrical devices of the general character described wherein an adapter plate and a rear panel are configured for easy registration and assembly is a further feature of the present invention.

Another aspect of the present invention is to provide a cover for outdoor electrical devices of the general character described wherein a selected adapter plate is interlocked with an access panel of the cover through mating groove and channel pairs.

A further feature of the present invention is to provide a cover for outdoor electrical devices of the general character described wherein components can be economically molded.

A still further consideration of the present invention is to provide a cover for outdoor electrical devices of the general character described which achieves a water resistant interlock between an adapter plate and an access panel of the cover.

BRIEF DESCRIPTION OF THE DRAWINGS

In the accompanying drawings, wherein some of the various possible exemplary embodiments of the invention are shown.

DESCRIPTION OF THE PREFERRED EMBODIMENT

Figure 1:
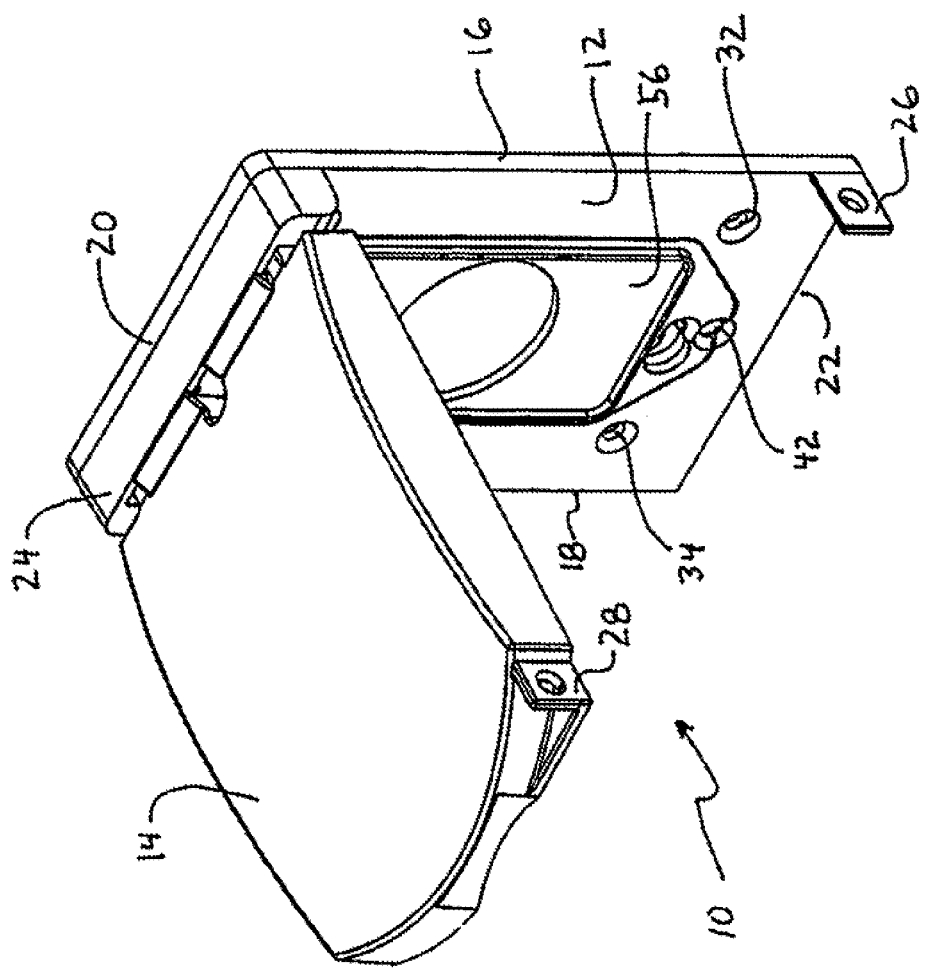
FIG. 1 is an isometric view of an electrical device cover constructed in accordance with and embodying the present invention and showing a hinged lid in an open position and illustrating an access panel with an adapter plate.
Figure 2:
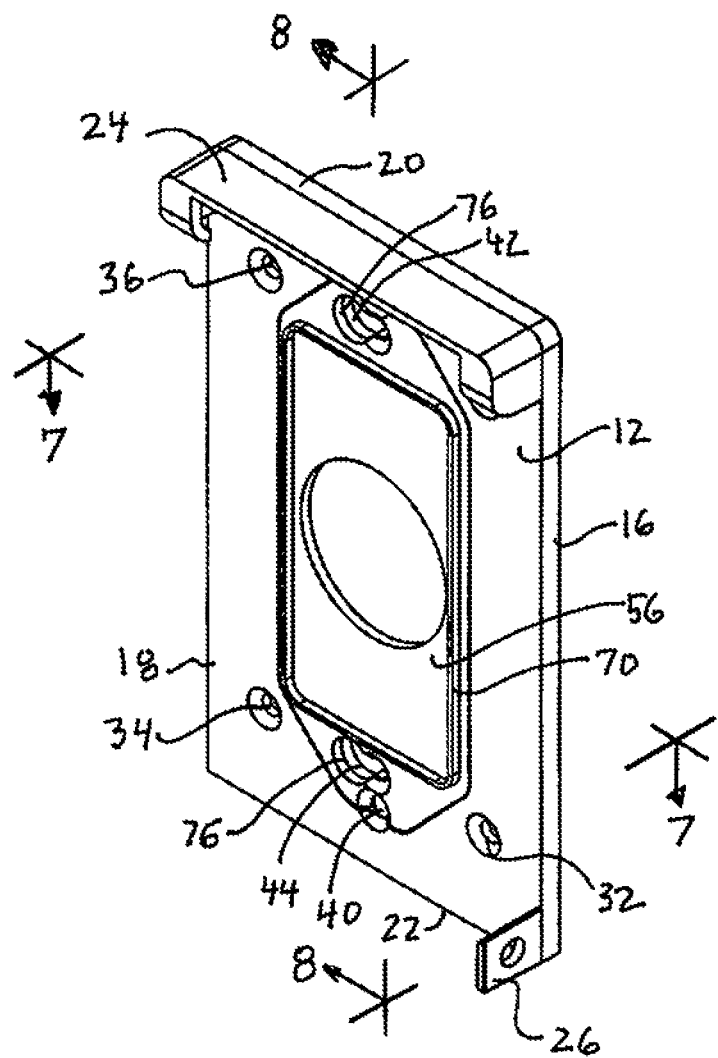
FIG. 2 an isometric view, similar to FIG. 1, however with a cover lid removed.

Referring now in detail to the drawings, the reference numeral 10 denotes generally a cover for outdoor electrical devices constructed in accordance with and embodying the present invention. The cover 10 includes an access panel 12 and a hinged lid 14. The access panel 12 includes a pair of parallel longitudinal side edges 16, 18, a top edge 20 and a bottom edge 22. A lid hinge flange 24 projects forwardly from the top edge 20, as best illustrated in FIGS. 1 and 2.

Projecting forwardly from the access panel 12 is a flange 26 and projecting from the lid 14 is a flange 28. When the lid is closed apertures of the flanges 26, 28 are registered with one another so that the electrical device can be secured against unauthorized access by a padlock, for example.

Figure 3:
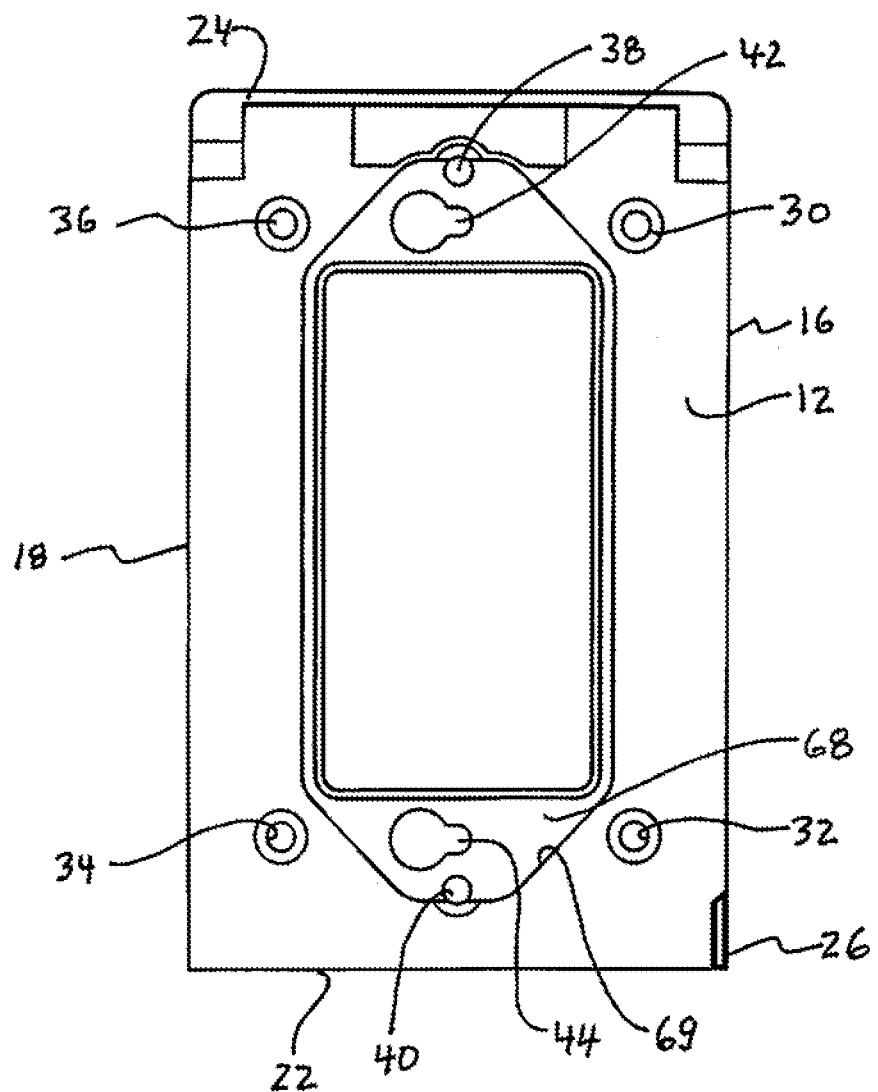
FIG. 3 is a front elevational view of the access panel without the adapter plate.
Figure 4:
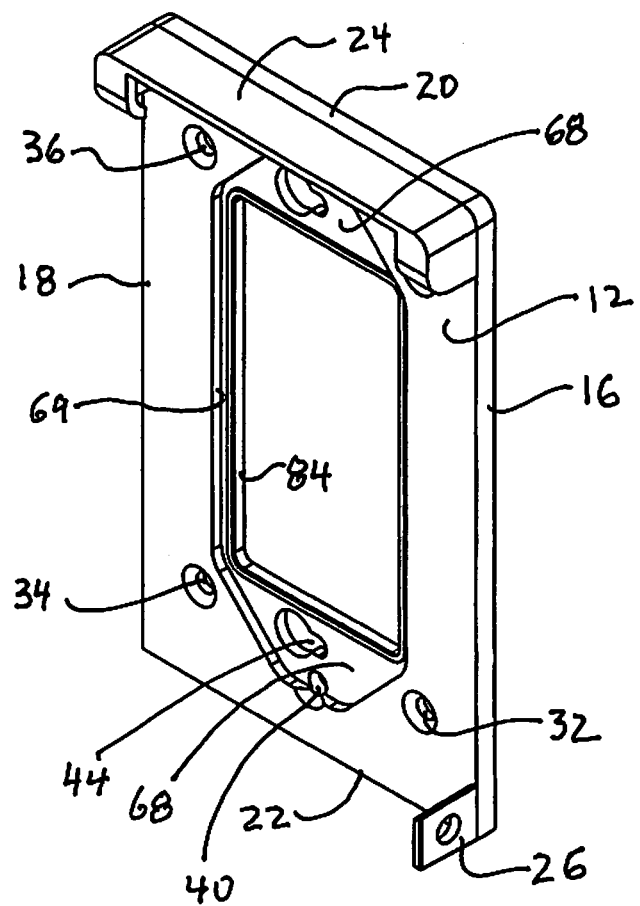
FIG. 4 is an isometric view of the access panel, similar to FIG. 2, without the adapter plate.
Figure 5:
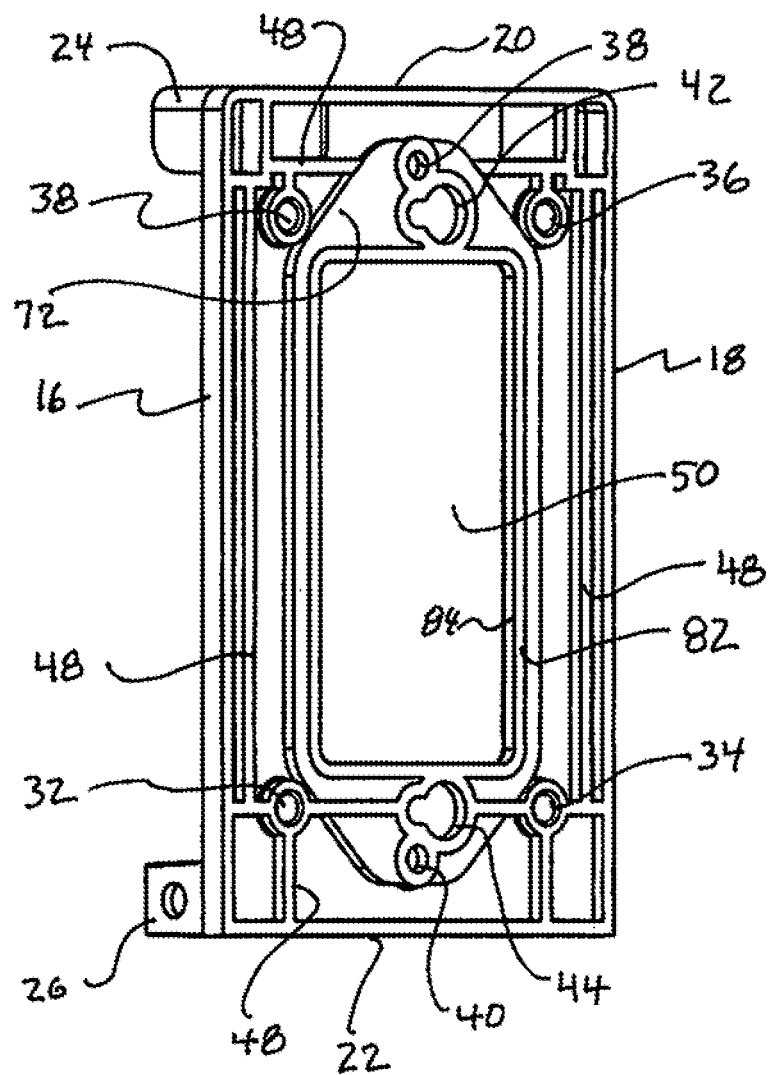
FIG. 5 is an isometric view of the access panel showing the rear face thereof.

With reference now to FIGS. 3, 4 and 5, it will be seen that the access panel 12 includes a plurality of corner mounting holes 30, 32, 34 and 36 which may be employed if registered with mounting screw apertures of the electrical box. Additional mounting holes 38, 40, and keyhole slots 42, 44 are provided for possible registration with different screw apertures of the electrical box. An array or lattice of unitary reinforcing ribs 48 is provided on the rear face of the access panel 12 and surrounds each mounting hole, as illustrated in FIG. 5.

As will be noted from an examination of FIGS. 3 through 6, the access panel includes a rectangular orifice 50 which is dimensioned larger than the largest operative face of an electrical device to be carried in the electrical box, e.g., larger than the face of a GFCI receptacle.

Figure 6:
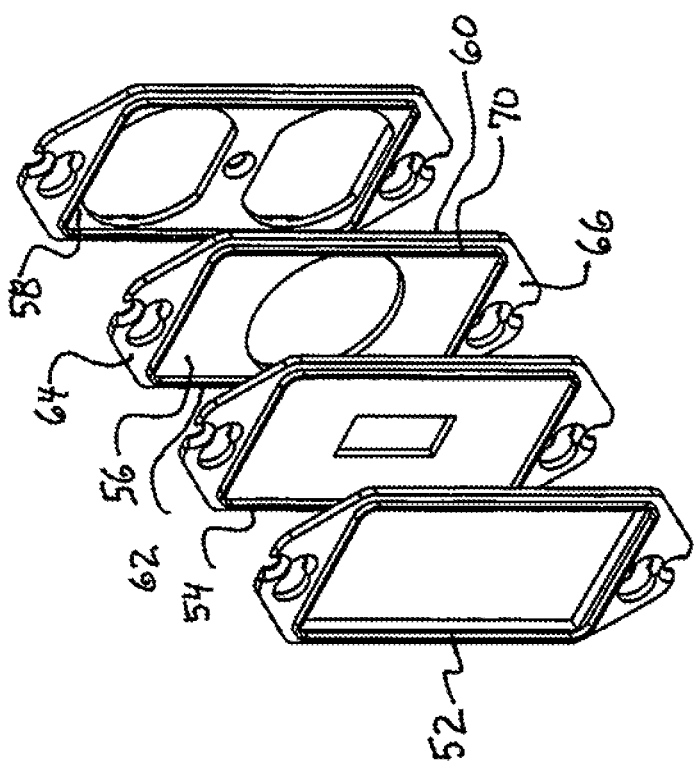
FIG. 6 is an isometric view of a variety of adapter plates, each having a differently shaped opening for accommodating the face of a specific electrical device.
Figure 7:
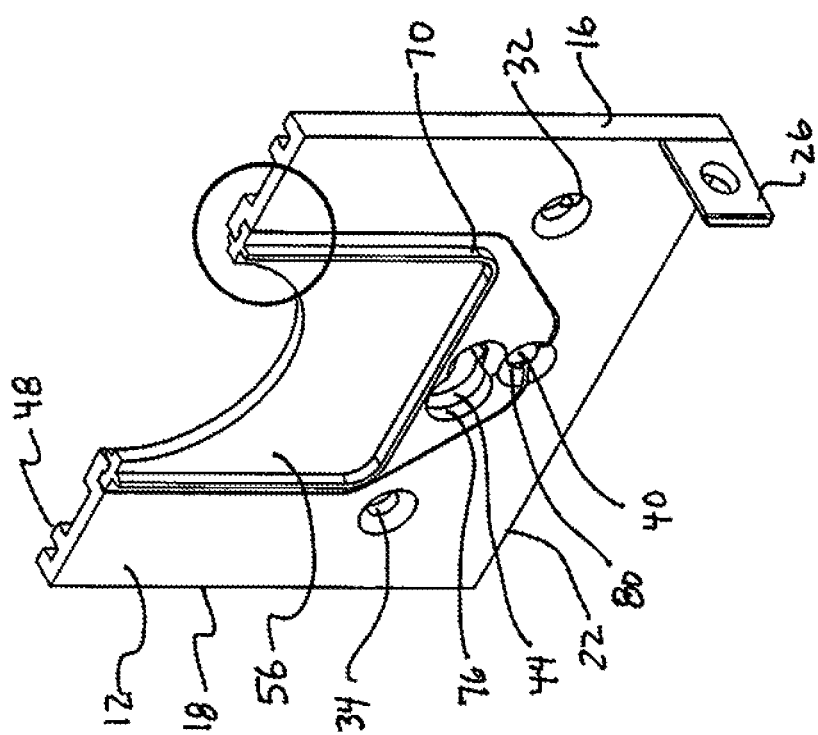
FIG. 7 is an enlarged scale sectional view taken substantially along the plane 7-7 of FIG. 2 and illustrating a fillet and channel formed on the rear face of the adapter plate and a mating fillet and channel on the front face of the access panel.
Figure 8:
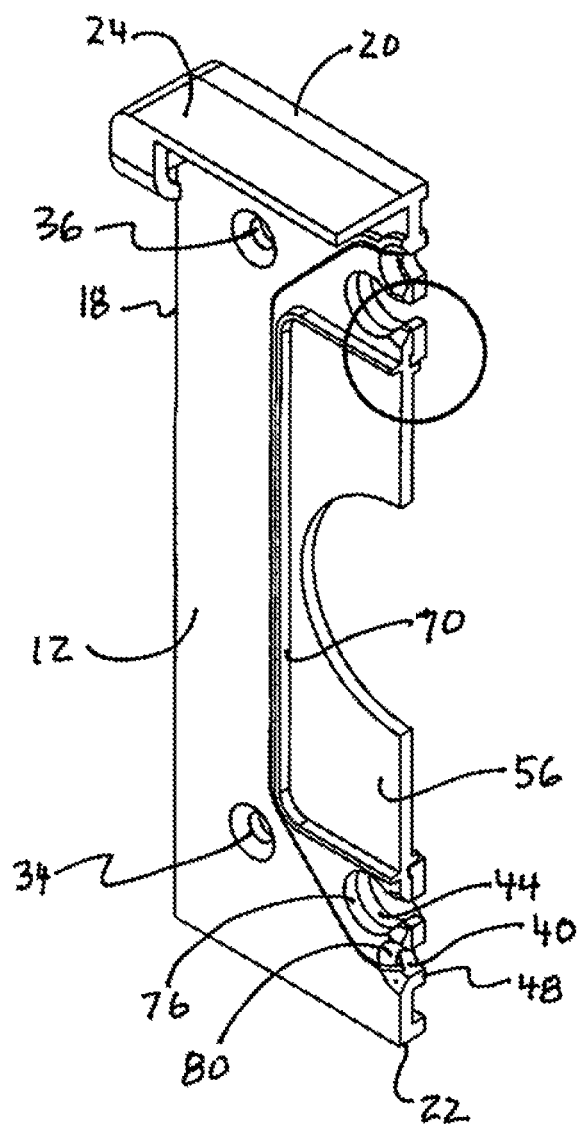
FIG. 8 is an enlarged scale sectional view taken substantially along the plane 8-8 of FIG. 2 and illustrating the fillet and channel formed on the rear face of the adapter plate and the mating fillet and channel on the front face of the access panel.

Pursuant to the invention the effective size and shape of the orifice 50 is modified to accommodate the operative face of an electrical device to be installed by a selected one of a plurality of adapter plates, e.g. the adapter plates 52, 54, 56 or 58, depicted in FIG. 6. Each adapter plate includes one or more openings dimensioned for a specific electrical device. By way of example, the opening of the adapter plate 52 accommodates a GFCI device or other devices having a GFCI sized operative face, such as those commonly sold under the registered trademark DECORA. The opening of the adapter plate 54 accommodates a conventional toggle switch; the opening of the adapter plate 56 accommodates a device having a circular face and the openings of the adapter plate 58 accommodate a conventional duplex receptacle. It should be understood that, with the exception of the size and shape of the adapter plate openings, the adapter plates are substantially identical.

With this in mind, further details of the adapter plates structures will be denoted with reference only to the adapter plate 56, illustrated in FIGS. 1, 2 and 6 through 10. The adapter plate 56 includes a generally rectangular planar body having parallel side edges 60, 62 and trapezium flanges 64, 66 which define its upper and lower boundaries.

From an examination of FIGS. 2 and 4, it will be seen that the adapter plate 56 seats within a congruent platform 68 depressed in the front face of the access panel 12 to facilitate alignment and registration of the adapter plate and access panel. The periphery of the platform is defined by a peripheral wall 69.

It should be noted that the front face of the adapter plate 56 is substantially flush with the front face of the access panel 12, with the exception of a rectangular flange 70 which projects from the front face of the adapter plate. To maintain the thickness of the access panel in the area of the depressed platform 68, the rear face of the access panel includes a corresponding rearwardly extending projection 72.

The trapezium flanges 64, 66 include keyhole slots 74, 76, which register with the access panel keyhole slots 42, 44, respectively and a pair of partially open apertures 78, 80, which are registered with the access panel mounting holes 38, 40. Device mounting screws which extend through the keyhole slots or the holes 38, 40 and apertures 78, 80 are tightened to secure the adapter plate within the platform 68 and will also secure the cover 10 to the electrical box in the event the mounting holes 30, 32, 34, 36 are not utilized.

Significantly, the trapezium flanges 64, 66 and the corresponding areas of the platform 68 present enlarged full contact abutment surface areas for simplified registration of the adapter plate and access panel. Additionally, the aforesaid enlarged full contact areas serve to structurally assure against dislodgement due to potential stresses resulting from over tightening of mounting screws which may be engaged in the holes 38, 40 or the slots 42, 44.

Figure 9:
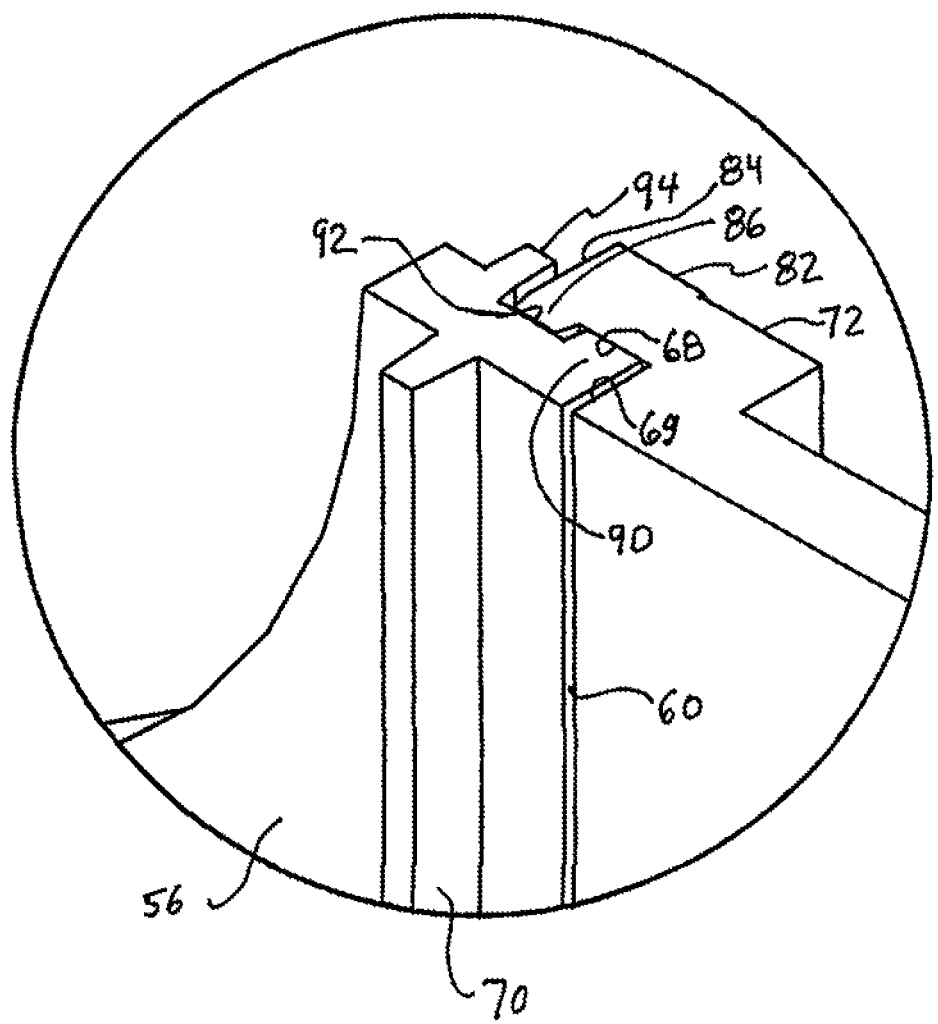
FIG. 9 is a greatly enlarged illustration of a portion of FIG. 7 depicted within the circled area of FIG. 7.
Figure 10:
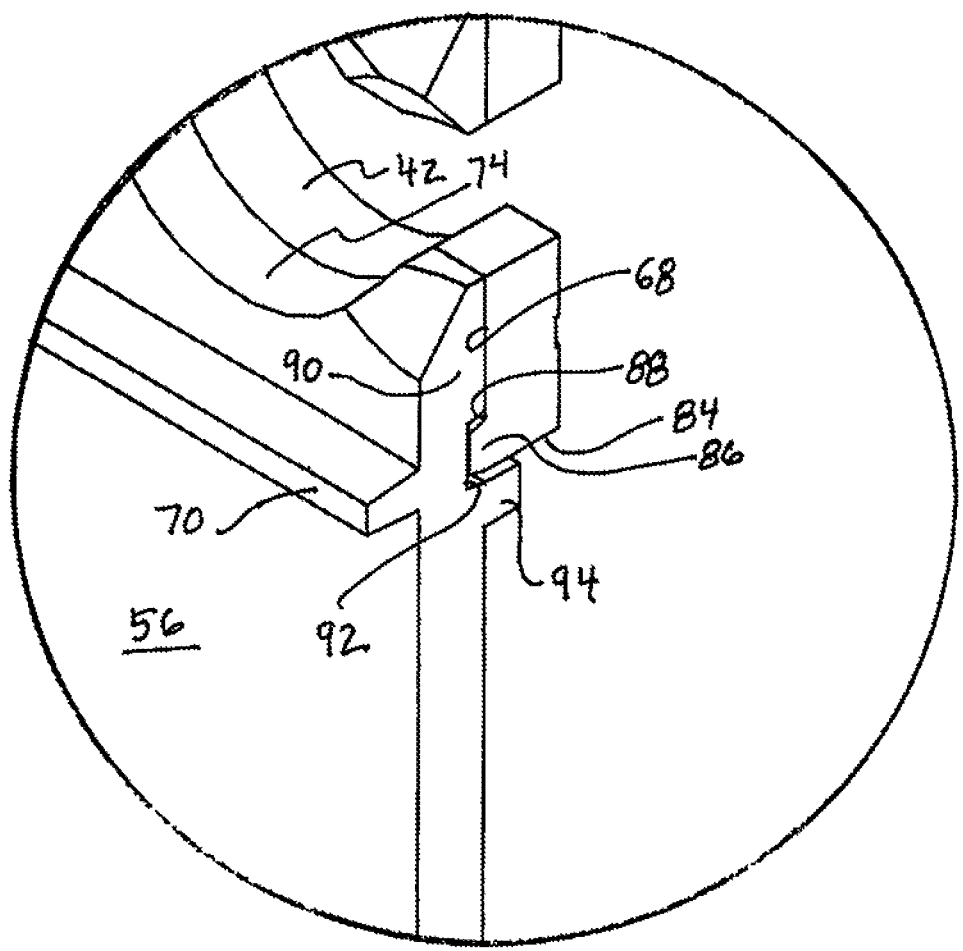
FIG. 10 is a greatly enlarged illustration of a portion of FIG. 8 depicted within the circled area of FIG. 8.

As illustrated in FIGS. 9 and 10, a portion 82 of the rib 48 includes a rectangular wall 84 which defines the access panel orifice 50. The wall 84 projects forwardly of the depressed platform 68, forming a fillet 86. The portion of the depressed platform 68 between the fillet 86 and the peripheral wall 69 comprises a seat or channel 88. It should be noted that the peripheral wall 69 boundary of the channel 88 is not visible in FIG. 10. Seated within the channel 88 is a fillet 90 comprising a rearwardly extending peripheral flange of the adapter plate 56.

The rear face of the adapter plate 56 includes a continuous rearwardly extending flange 94 which defines an inner wall of the channel 92 and which surrounds the wall 84. Thus, a sturdy water resistant interlock between the adapter plate 56 and the access panel 12 is effected by the fillet 90 and channel 92 formed on the rear face of the adapter plate and the mating fillet 86 and channel 88 on the front face of the access panel 12. A gasket, such as illustrated in U.S. Pat. No. 5,280,135, may be positioned between the rear face of the access panel and the electrical device. The adapter plates, access panel and lid may be economically molded of metal or suitable thermoplastic. If fabricated or metal, one or more components may be powder coated or otherwise treated with a weather resistant coating.

In accordance with the invention, the cover 10 may be employed to protect and cover an electrical device housed in an electrical box by selecting an adapter plate having an opening dimensioned to receive the operative face of the device, interlocking the fillets in their respective channels by seating the adapter plate in the depressed platform, registering the adapter plate opening with the device; and securing the cover by tightening screws extending through the mounting holes or slots in the adapter plate.

Thus it will be seen that there is provided a cover for outdoor electrical devices which achieves the various aspects, features and considerations of the present invention and which is well suited for practical use.

All publications and references cited herein are expressly incorporated herein by reference in their entirety.

In the figures of this application, in some instances, a plurality of elements may be shown as illustrative of a particular element, and a single element may be shown as illustrative of a plurality of a particular elements. Showing a plurality of a particular element is not intended to imply that a system or method implemented in accordance with the invention must comprise more than one of that element or step, nor is it intended by illustrating a single element that the invention is limited to embodiments having only a single one of that respective element. Those skilled in the art will recognize that the numbers of a particular element shown in a drawing can, in at least some instances, be selected to accommodate the particular user needs.

The particular combinations of elements and features in the above-detailed embodiments are exemplary only; the interchanging and substitution of these teachings with other teachings in this and the incorporated-by-reference patents and applications are also expressly contemplated. As those skilled in the art will recognize, variations, modifications, and other implementations of what is described herein can occur to those of ordinary skill in the art without departing from the spirit and the scope of the invention as claimed.

Further, in describing the invention and in illustrating embodiments of the invention in the figures, specific terminology, numbers, dimensions, materials, etc., are used for the sake of clarity. However the invention is not limited to the specific terms, numbers, dimensions, materials, etc. so selected, and each specific term, number, dimension, material, etc., at least includes all technical and functional equivalents that operate in a similar manner to accomplish a similar purpose. Use of a given word, phrase, number, dimension, material, language terminology, product brand. etc. is intended to include all grammatical, literal, scientific, technical, and functional equivalents. The terminology used herein is for the purpose of description and not limitation.

Having described the preferred embodiments of the invention, it will now become apparent to one of ordinary skill in the art that other embodiments incorporating their concepts may be used. Moreover, those of ordinary skill in the art will appreciate that the embodiments of the invention described herein can be modified to accommodate and/or comply with changes and improvements in the applicable technology and standards referred to herein. For example, the technology can be implemented in many other, different, forms, and in many different environments, and the technology disclosed herein can be used in combination with other technologies. Variations, modifications, and other implementations of what is described herein can occur to those of ordinary skill in the art without departing from the spirit and the scope of the invention as claimed. It is felt therefore that these embodiments should not be limited to disclosed embodiments but rather should be limited only by the spirit and scope of the appended claims.

The particular combinations of elements and features in the above-detailed embodiments are exemplary only; the interchanging and substitution of these teachings with other teachings in this and the referenced patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

Having thus described the invention, there is claimed as new and desired to be secured by Letters Patent:

1. An electrical device cover comprising an access panel having a front face, a rear face, an orifice through the panel, and an adapter plate, the adapter plate configured with an opening dimensioned to receive an operative face of the electrical device, the adapter plate including a front face and a rear face, the front face of the access panel including a depressed platform dimensioned to receive at least a flange portion of the adapter plate, the cover further including an interlock between the access panel and the adapter plate, the interlock comprising a channel formed on the rear face of the adapter plate and a forwardly projecting fillet formed on the front face of the access panel, the access panel fillet being seated in the adapter plate channel.

2. An electrical device cover in accordance with claim 1, the interlock further comprising a rearwardly projecting fillet formed on the rear face of the adapter plate and a channel formed on the front face of the access panel, the rearwardly projecting adapter plate fillet being seated in the access panel channel.

3. An electrical device cover in accordance with claim 1, further including a plurality of adapter plates, each configured with a differently dimensioned opening, whereby any of a plurality of electrical devices may be covered.

4. An electrical device cover in accordance with claim 1, wherein the adapter plate includes a generally planar body and the flange portion comprises at least one trapezium flange.

5. An electrical device cover in accordance with claim 4, wherein the flange portion comprises a pair of trapezium flanges which define the longitudinal boundaries of the adapter plate.

6. An electrical device cover in accordance with claim 4, wherein said at least one trapezium flange is seated in the depressed platform.

7. An electrical device cover in accordance with claim 1, the access panel including a hinge flange, the cover further including a lid hinged to the flange.

8. An electrical device cover in accordance with claim 7, wherein the access panel includes a forwardly extending flange having a first aperture and the lid includes a forwardly extending flange having a second aperture, the first and second apertures being registered when the lid is closed, whereby the electrical device may be secured by a padlock extending through the registered apertures.

9. An electrical device cover in accordance with claim 1, wherein the access panel orifice is dimensioned larger than the dimensions of the operative face of a ground fault circuit interrupter and the adapter plate opening is dimensioned for an electrical device selected from the group consisting of a ground fault circuit interrupter sized device, a toggle switch, a circular receptacle and a duplex receptacle.

10. An electrical device cover comprising an access panel having a front face, a rear face, an orifice through the panel, and an adapter plate, the adapter plate configured with an opening dimensioned to receive an operative face of the electrical device, the adapter plate including a front face and a rear face, the front face of the access panel including a depressed platform dimensioned to receive at least a flange portion of the adapter plate, the cover further including an interlock between the access panel and the adapter plate, the interlock comprising a rearwardly projecting fillet formed on the rear face of the adapter plate and a channel formed on the front face of the access panel, the rearwardly projecting fillet being seated in the access panel channel.

11. An electrical device cover in accordance with claim 10, further including a plurality of adapter plates, each configured with a differently dimensioned opening, whereby any of a plurality of electrical devices may be covered.

12. A method of covering an electrical device housed in an electrical box, employing a cover constructed in accordance with claim 11, the adapter plates further including mounting holes or slots, the method comprising the steps of:
  a) selecting an adapter plate having an opening dimensioned to receive the operative face of the device;
  b) interlocking the fillet formed on the rear face of the adapter plate in the channel formed on the front face of the access panel by positioning the adapter plate in the depressed platform;
  c) registering the adapter plate opening with the device; and
  d) securing the cover by tightening screws extending through the mounting holes or slots in the adapter plate.

13. An electrical device cover in accordance with claim 10, wherein the adapter plate includes a generally planar body and the flange portion comprises at least one trapezium flange.

14. An electrical device cover in accordance with claim 13, wherein the trapezium flange is seated in the depressed platform.

15. A kit for covering one of a plurality of electrical devices, the kit comprising an access panel, the access panel including a front face, a rear face and an orifice, a lid configured to be hinged to the access panel, a plurality of adapter plates, each adapter plate configured with a front face, a rear face and an opening dimensioned to receive an operative face of one of the plurality of electrical devices, the front face of the access panel including a depressed platform dimensioned to receive at least a flange portion of the adapter plate, an interlock between the access panel and one of said adapter plates, the interlock comprising a channel formed on the rear face of one of said adapter plates or the front face of the access panel and a fillet formed on the front face of the access panel or on the rear face of one of said adapter plates, the fillet being seated in the channel.

16. A kit for covering one of a plurality of electrical devices in accordance with claim 15 wherein the one of said adapter plates includes a generally planar body and the flange portion comprises at least one trapezium flange, the at least one trapezium flange being seated in the depressed platform.

17. A kit for covering one of a plurality of electrical devices in accordance with claim 15, wherein the access panel orifice is dimensioned larger than the dimensions of the operative face of a ground fault circuit interrupter and the adapter plate opening is dimensioned for an electrical device selected from the group consisting of a ground fault circuit interrupter sized device, a toggle switch, a circular receptacle and a duplex receptacle.

18. A kit for covering one of a plurality of electrical devices in accordance with claim 15, wherein the rear face of the access panel includes a lattice of reinforcing ribs.

19. A kit for covering one of a plurality of electrical devices in accordance with claim 15, the access panel including a hinge flange, the cover further including a lid hinged to the flange.

20. A kit for covering one of a plurality of electrical devices in accordance with claim 19, wherein the access panel includes a forwardly extending flange having a first aperture and the lid includes a forwardly extending flange having a second aperture, the first and second apertures being registered when the lid is closed, whereby the electrical device may be secured by a padlock extending through the registered first and second apertures.

* * * * *